United States Patent
Ikeda

(10) Patent No.: US 10,422,697 B2
(45) Date of Patent: Sep. 24, 2019

(54) IMAGE PROCESSING APPARATUS, METHOD FOR CONTROLLING THE SAME, AND STORAGE MEDIUM

(71) Applicant: CANON KABUSHIKI KAISHA, Tokyo (JP)

(72) Inventor: Toru Ikeda, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/182,431

(22) Filed: Nov. 6, 2018

(65) Prior Publication Data

US 2019/0094075 A1 Mar. 28, 2019

Related U.S. Application Data

(63) Continuation of application No. 15/600,062, filed on May 19, 2017, now Pat. No. 10,154,170.

(30) Foreign Application Priority Data

May 25, 2016 (JP) .................................. 2016-104436

(51) Int. Cl.
| | |
|---|---|
| G01J 3/50 | (2006.01) |
| G06K 7/10 | (2006.01) |
| G01J 3/457 | (2006.01) |
| H04N 1/00 | (2006.01) |
| H04N 1/32 | (2006.01) |

(52) U.S. Cl.
CPC .............. *G01J 3/457* (2013.01); *G01J 3/506* (2013.01); *H04N 1/0009* (2013.01); *H04N 1/00037* (2013.01); *H04N 1/00408* (2013.01); *H04N 1/00771* (2013.01); *H04N 1/3263* (2013.01); *H04N 1/32657* (2013.01); *G06K 7/1095* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2013/0077111 A1* | 3/2013 | Yasui | ..................... G06F 9/453 |
| | | | 358/1.12 |
| 2014/0160511 A1 | 6/2014 | Yamada | |
| 2016/0292552 A1* | 10/2016 | Daigo | ..................... B65H 7/00 |

FOREIGN PATENT DOCUMENTS

| | | |
|---|---|---|
| CN | 104570650 A | 4/2015 |
| CN | 104714381 A | 6/2015 |
| JP | 2003295546 A | 10/2003 |

\* cited by examiner

*Primary Examiner* — Kristy A Haupt
(74) *Attorney, Agent, or Firm* — Canon U.S.A., Inc. IP Division

(57) ABSTRACT

An image processing apparatus including a display unit includes a processor and a memory storing instructions, when executed by the processor, causing the image processing apparatus to function as a detection unit that detects occurrence of a sheet jammed inside the image processing apparatus and a display control unit that displays a screen based on detection of the occurrence of the jammed sheet. The screen includes a first region for displaying work that a user carries out to remove jammed sheets from inside the image processing apparatus and a second region for displaying work that the user carries out after removing the jammed sheets from inside the image processing apparatus.

12 Claims, 12 Drawing Sheets

FIG.4A

| MAINTENANCE ID (401) | CORRESPONDING SENSOR POSITION Bit (402) | MOVING IMAGE ID (403) |
|---|---|---|
| 001 | Bit1 | A1 |
| | | A2 |
| | | A3 |
| | | A6 |
| 002 | Bit3 | A7 |
| | | A4 |
| | | A5 |
| | | A8 |
| 003 | Bit1, Bit2 | A1 |
| | | A2 |
| | | A3 |
| | | A9 |
| | | A6 |
| 004 | Bit2 | A1 |
| | | A9 |
| | | A6 |
| 005 | — | B1 |
| | | B5 |
| | | B6 |
| | | B7 |
| | | B14 |
| ... | | |

FIG.4B

| MOVING IMAGE ID | MOVING IMAGE FILE | RECORDING TIME | COVER OPEN/ CLOSE FLAG | MESSAGE |
|---|---|---|---|---|
| A1 | /movie/A1.mpeg | 0:10 | 0 | PLEASE OPEN THE RIGHT COVER. |
| A2 | /movie/A2.mpeg | 0:20 | 1 | PLEASE REMOVE THE PAPER AT THE CONVEYANCE PORTION. |
| A3 | /movie/A3.mpeg | 0:20 | 1 | PLEASE REMOVE THE PAPER AT THE CONVEYANCE PORTION. |
| A4 | /movie/A4.mpeg | 0:20 | 1 | PLEASE REMOVE THE PAPER AT THE TRANSFER PORTION. |
| A5 | /movie/A5.mpeg | 0:20 | 1 | PLEASE REMOVE THE PAPER AT THE TRANSFER PORTION. |
| A6 | /movie/A6.mpeg | 0:10 | 1 | PLEASE CLOSE THE RIGHT COVER. |
| A7 | /movie/A7.mpeg | 0:10 | 0 | PLEASE OPEN THE FRONT COVER. |
| A8 | /movie/A8.mpeg | 0:10 | 1 | PLEASE CLOSE THE FRONT COVER. |
| A9 | /movie/A9.mpeg | 0:10 | 1 | PLEASE REMOVE THE PAPER AT THE TWO-SIDED PORTION. |
| B1 | /movie/B1.mpeg | 0:10 | 1 | PLEASE OPEN THE TONER COVER. |
| B2 | /movie/B2.mpeg | 0:20 | 1 | PLEASE UNLOAD THE EMPTY MAGENTA TONER CARTRIDGE. |
| B3 | /movie/B3.mpeg | 0:40 | 1 | PLEASE PREPARE A NEW MAGENTA TONER CARTRIDGE. |
| B4 | /movie/B4.mpeg | 0:30 | 1 | PLEASE LOAD THE NEW MAGENTA TONER CARTRIDGE. |
| B5 | /movie/B5.mpeg | 0:20 | 1 | PLEASE UNLOAD THE EMPTY CYAN TONER CARTRIDGE. |
| B6 | /movie/B6.mpeg | 0:40 | 1 | PLEASE PREPARE A NEW CYAN TONER CARTRIDGE. |
| B7 | /movie/B7.mpeg | 0:30 | 1 | PLEASE LOAD THE NEW CYAN TONER CARTRIDGE. |
| B8 | /movie/B8.mpeg | 0:20 | 1 | PLEASE UNLOAD THE EMPTY YELLOW TONER CARTRIDGE. |
| B9 | /movie/B9.mpeg | 0:40 | 1 | PLEASE PREPARE A NEW YELLOW TONER CARTRIDGE. |
| B10 | /movie/B10.mpeg | 0:30 | 1 | PLEASE LOAD THE NEW YELLOW TONER CARTRIDGE. |
| B11 | /movie/B11.mpeg | 0:20 | 1 | PLEASE UNLOAD THE EMPTY BLACK TONER CARTRIDGE. |
| B12 | /movie/B12.mpeg | 0:40 | 1 | PLEASE PREPARE A NEW BLACK TONER CARTRIDGE. |
| B13 | /movie/B13.mpeg | 0:30 | 1 | PLEASE LOAD THE NEW BLACK TONER CARTRIDGE. |
| B14 | /movie/B14.mpeg | 0:10 | 1 | PLEASE CLOSE THE TONER COVER. |
| ... | | | | |

FIG.4C

| SENSOR | SENSOR POSITION Bit | COVER |
|---|---|---|
| CONVEYANCE PORTION SENSOR | Bit1 | RIGHT COVER |
| TWO-SIDED PORTION SENSOR | Bit2 | RIGHT COVER |
| TRANSFER PORTION SENSOR | Bit3 | FRONT COVER |
| ... | | |

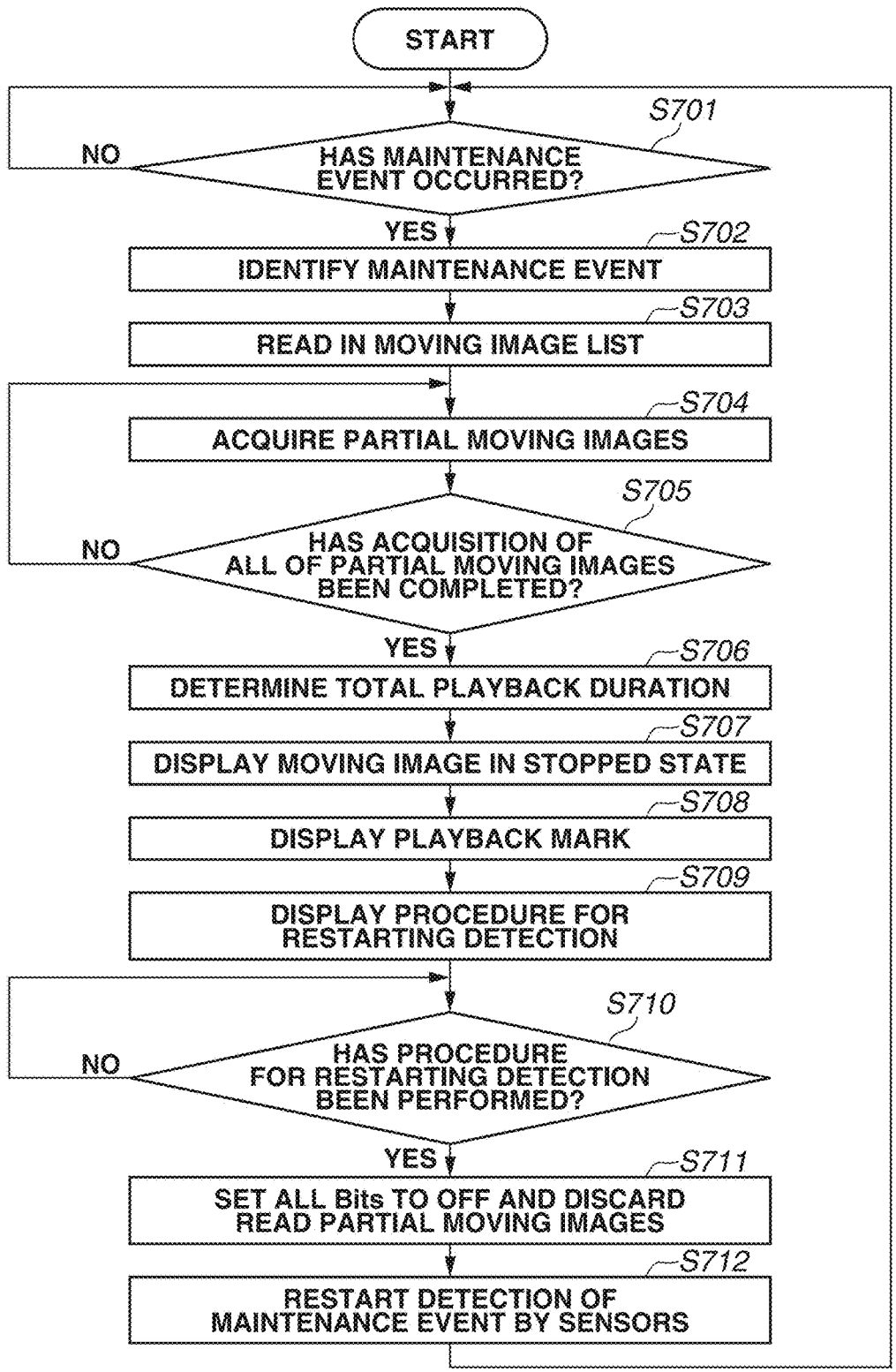

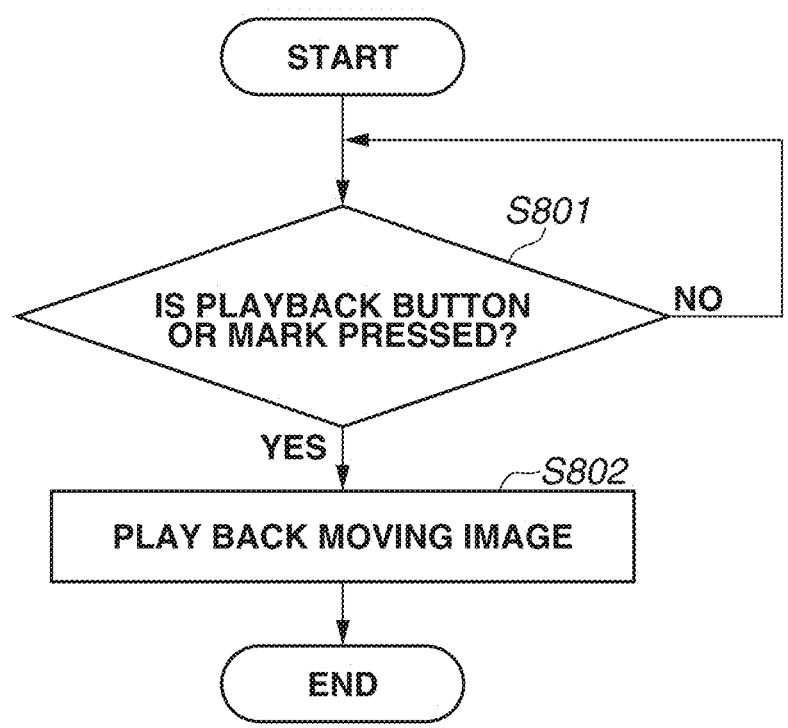

FIG.9

| MAINTENANCE ID (401) | CORRESPONDING SENSOR POSITION Bit (402) | MOVING IMAGE ID (403) | NOTIFICATION FLAG (404) |
|---|---|---|---|
| 001 | Bit1 | A1<br>A2<br>A3<br>A6 | |
| 002 | Bit3 | A7<br>A4<br>A5<br>A8 | |
| 003 | Bit1, Bit2 | A1<br>A2<br>A3<br>A9<br>A6 | ○ |
| 004 | Bit2 | A1<br>A9<br>A6 | |
| 005 | — | B1<br>B5<br>B6<br>B7<br>B14 | |
| ... | | | |

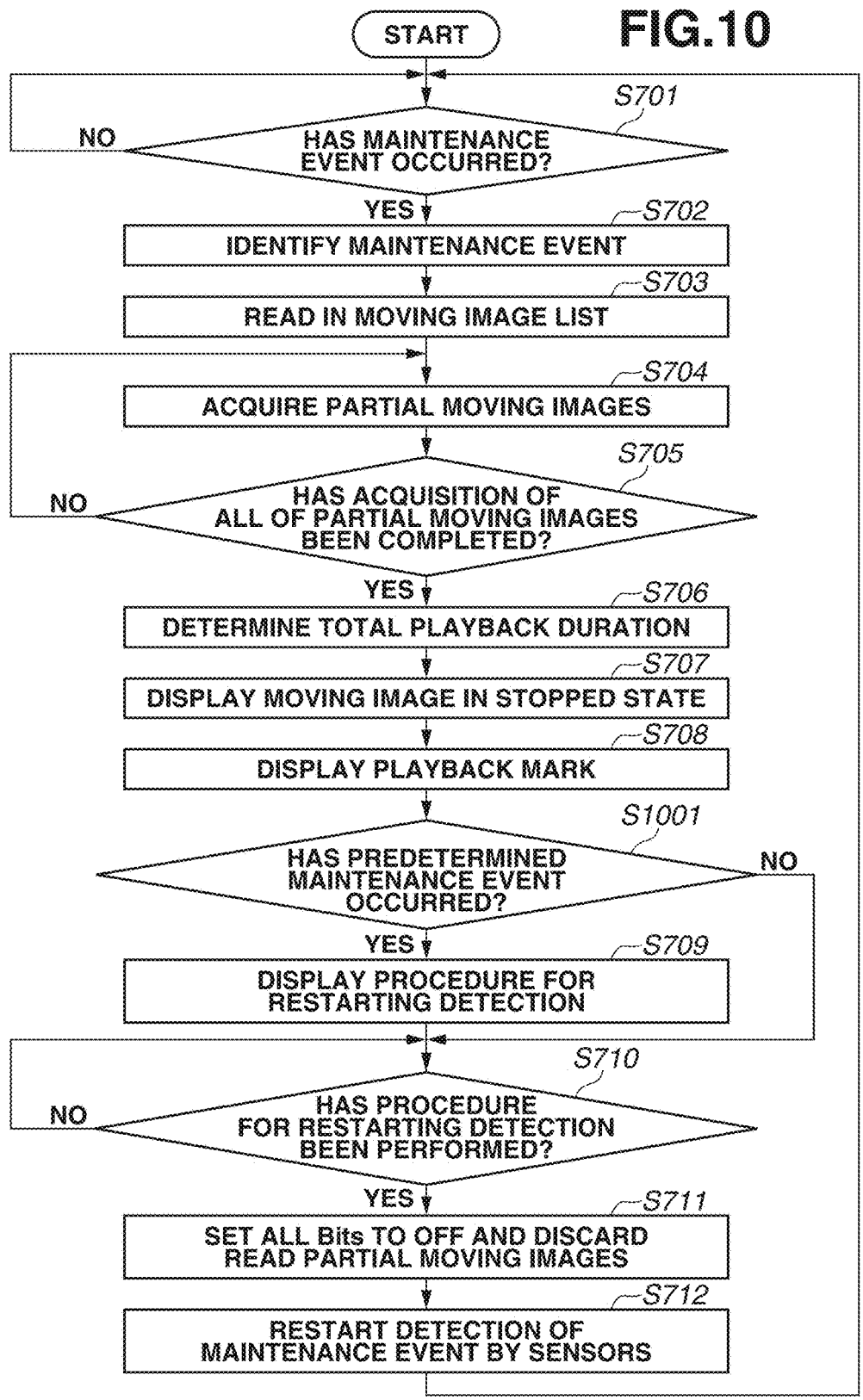

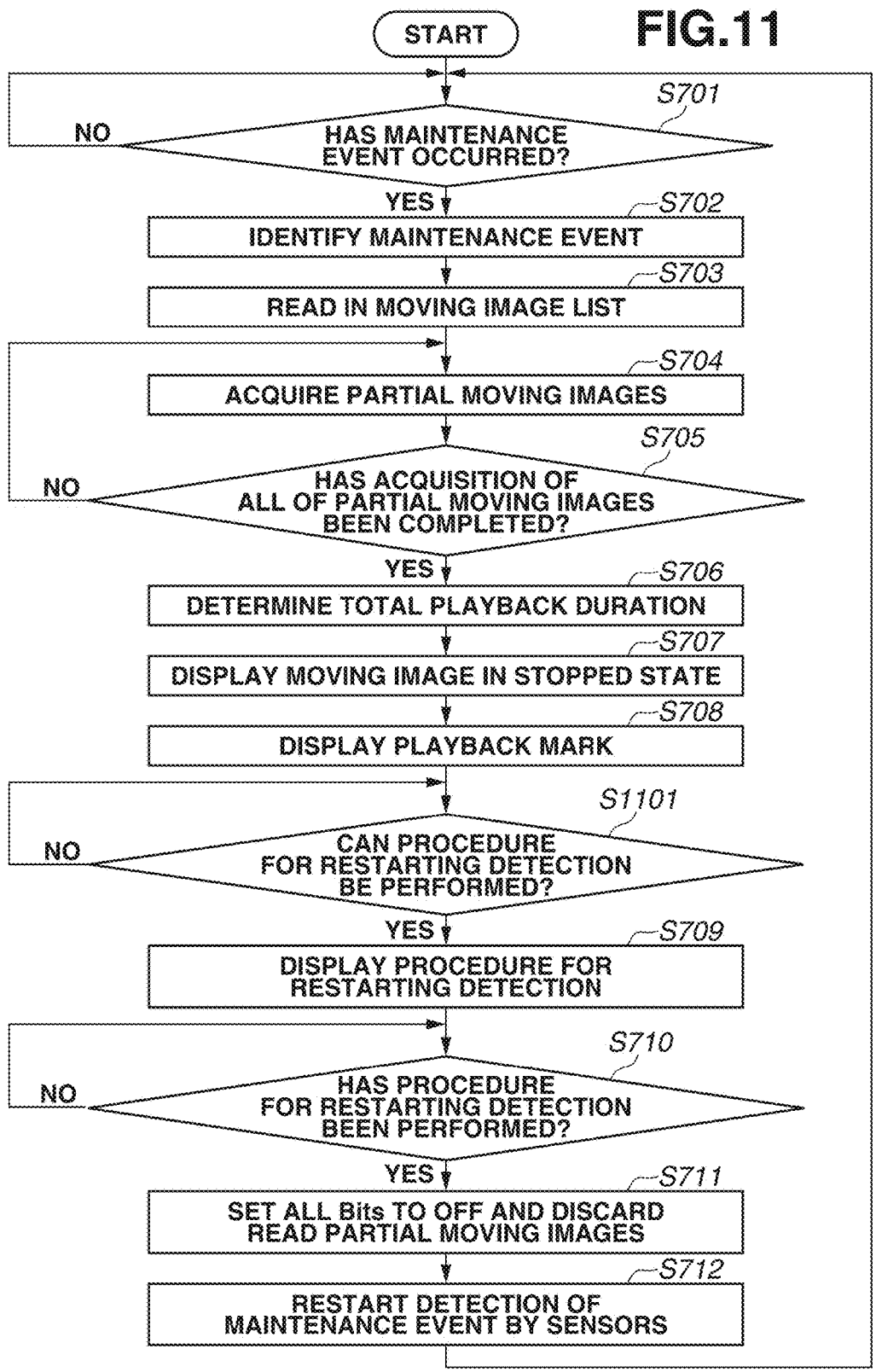

IMAGE PROCESSING APPARATUS, METHOD FOR CONTROLLING THE SAME, AND STORAGE MEDIUM

CROSS-REFERENCE TO RELATED APPLICATION

This application is a continuation of U.S. patent application Ser. No. 15/600,062, filed on May 19, 2017, which claims priority from Japanese Patent Application No. 2016-104436, filed May 25, 2016, all of which are hereby incorporated by reference herein in their entirety.

BACKGROUND

Field

The present disclosure relates to an image processing apparatus, a method for controlling the image processing apparatus, and a storage medium.

Description of the Related Art

An image processing apparatus discussed in Japanese Patent Application Laid-Open No. 2015-82706, when a sensor detects that a jam (a paper jam) has occurred in the image processing apparatus, presents work for resolving the detected jam to a user using a moving image or a still image. For example, work of opening a cover to expose a portion where the jam has occurred, work of removing the jammed paper, and work of closing the above-described cover are displayed on a display unit of the image processing apparatus as the moving image when the jam has occurred. The user opens the above-described cover and removes the jammed paper according to the work indicated in the moving image or the still image displayed on the display unit. Then, when the user closes the cover, the image processing apparatus resets the sensor, and can detect again whether a jam has occurred. If a jam is detected again, the image processing apparatus displays a procedure for resolving the detected jam on the display unit. If no jam has occurred, the image processing apparatus ends the display of the moving image indicating the work for resolving the jam.

In this manner, conventionally, the image processing apparatus displays the work that the user should carry out after having removed the jammed paper from inside the image processing apparatus at the time of the occurrence of the jam, after having displayed the image indicating the work of removing the jammed paper.

SUMMARY

According to an aspect of the present disclosure, an image processing apparatus including a display unit includes a processor and a memory storing instructions, when executed by the processor, cause the image processing apparatus to function as a detection unit configured to detect occurrence of a sheet jammed inside the image processing apparatus, and a display control unit configured to display a screen on the display unit based on detection of the occurrence of the sheet jammed inside the image processing apparatus. The screen includes a first region for displaying work that a user carries out to remove the jammed sheet from inside the image processing apparatus and a second region for displaying work that the user carries out after removing the jammed sheet from inside the image processing apparatus.

Further features will become apparent from the following description of exemplary embodiments with reference to the attached drawings.

BRIEF DESCRIPTION OF THE DRAWINGS

FIGS. 4A, 4B, and 4C illustrate a structure of data that defines a relationship between a maintenance event and a moving image according to the present exemplary embodiment.

FIG. 7 is a flowchart illustrating a processing procedure according to the present first exemplary embodiment.

FIG. 8 is a flowchart illustrating a processing procedure according to the present exemplary embodiment.

FIG. 9 illustrates a structure of data that defines the relationship between the maintenance event and the moving image according to a second exemplary embodiment.

FIG. 10 is a flowchart illustrating a processing procedure according to the second exemplary embodiment.

FIG. 11 is a flowchart illustrating a processing procedure according to a third exemplary embodiment.

DESCRIPTION OF THE EMBODIMENTS

In the following description, a first exemplary embodiment will be described with reference to the drawings.

Figure 1:
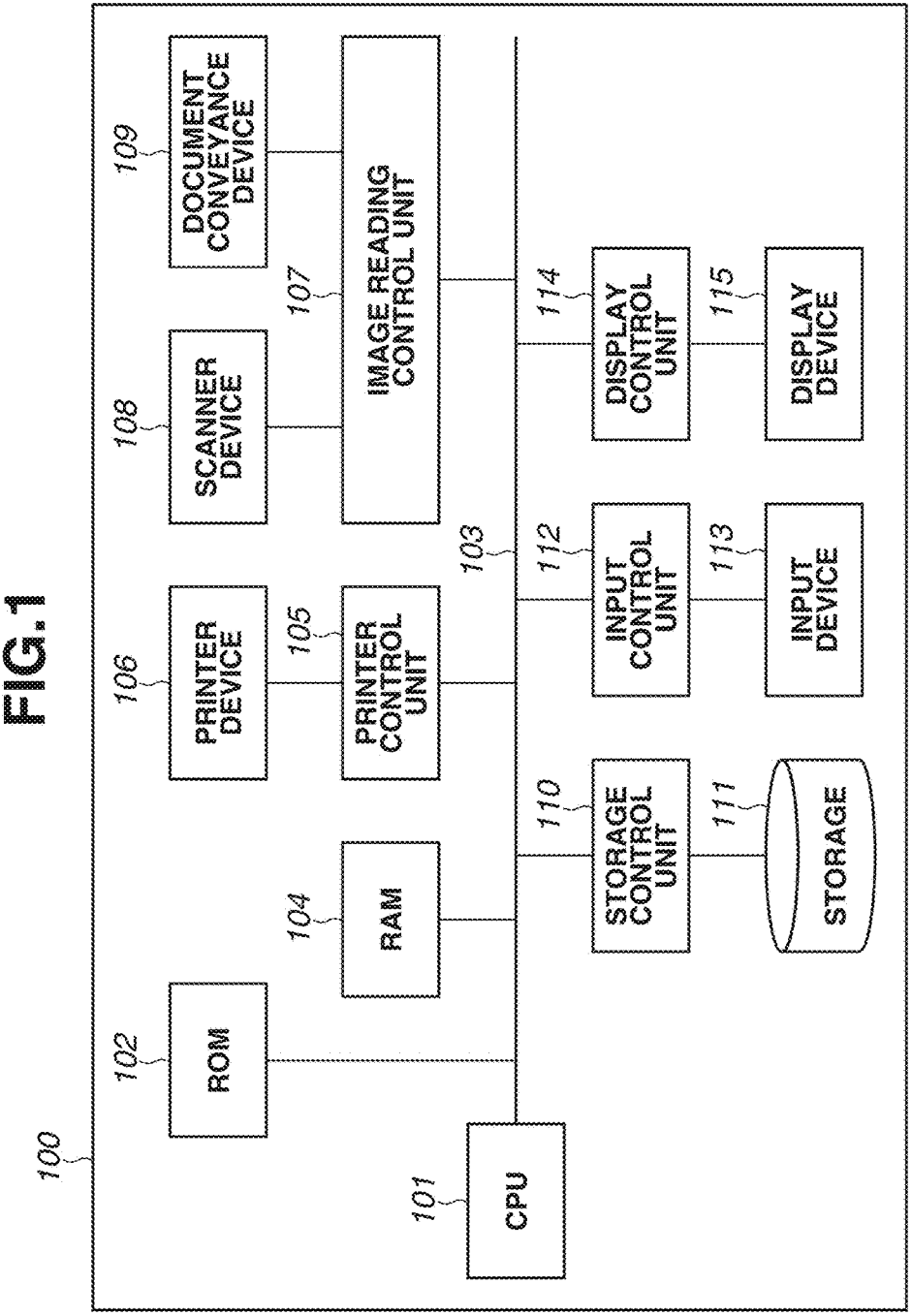
FIG. 1 is a block diagram illustrating a hardware configuration of an image processing apparatus according to an exemplary embodiment.

FIG. 1 is a block diagram illustrating an outline of a configuration of an image processing apparatus 100, such as a multifunction peripheral, according to the present exemplary embodiment.

The image processing apparatus 100 includes a central processing unit (CPU) 101, a read only memory (ROM) 102, a random access memory (RAM) 104, a printer control unit 105, an image reading control unit 107, a storage control unit 110, an input control unit 112, and a display control unit 114. They are connected to one another via a bus 103.

The image processing apparatus 100 also includes a storage 111, a printer device 106, a scanner device 108, a document conveyance device 109, an input device 113, and a display device 115.

The CPU 101 controls this image processing apparatus 100. The CPU 101 activates an operating system (OS) by a boot program stored in the ROM 102. Then, the CPU 101 executes a program stored in the storage 111. The RAM 104 is used as a temporary storage area, such as a main memory and a work area of the CPU 101. When the CPU 101 executes the program, the CPU 101 reads out this program from the storage 111 and stores the read program into the RAM 104.

The printer device 106 is controlled by the printer control unit 105, and prints image data onto a sheet, such as paper.

The scanner device 108 is controlled by the image reading control unit 107, and generates image data. The document conveyance device 109, such as an Auto Document Feeder (ADF), is controlled by the image reading control unit 107, and conveys documents placed on the document conveyance device 109 one by one to the scanner device 108. The scanner device 108 reads out the documents with use of an optical reading device, such as a charge coupled device (CCD), and converts image information on the documents into electric signal data.

The storage 111 is a readable and writable nonvolatile storage device, such as a hard disk drive (HDD). The storage 111 stores various kinds of data, such as a program for controlling the entire image processing apparatus 100, various kinds of application programs, and a moving image indicating maintenance work. Each of these programs is executed by the CPU 101. The storage control unit 110 controls the storage 111.

The input control unit 112 receives an operation instruction of a user via the input device 113, such as a touch panel and/or hardware keys. The display device 115, such as a liquid crystal display (LCD) and a cathode ray tube (CRT), is controlled by the display control unit 114, and displays an operation screen and a moving image to the user.

Figure 2:
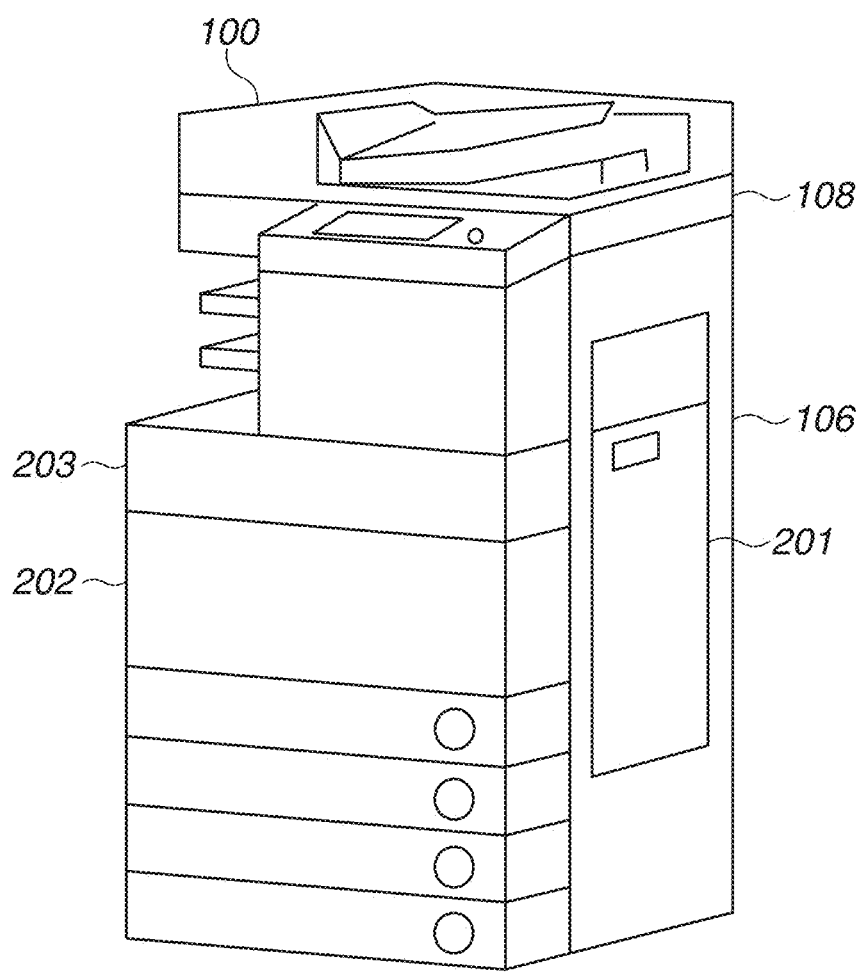
FIG. 2 is an external view illustrating an external appearance of the image processing apparatus according to the present exemplary embodiment.

FIG. 2 is an external view illustrating an external appearance of the image processing apparatus 100.

The image processing apparatus 100 includes a right cover 201, a front cover 202, and a toner cover 203.

When a jam occurs, the user opens a cover of the image processing apparatus 100 and removes jammed paper. For example, if the jam occurs on a conveyance path, the user opens the right cover 201 to expose the conveyance path and removes the jammed paper. If the jam occurs at a transfer portion, the user opens the front cover 202, extracts a transfer unit, which is described below, and removes the jammed paper. When replacing toner, the user opens the toner cover 203 to expose a portion where a toner container is loaded.

The image processing apparatus 100 includes sensors that detect cover opened/closed states of the above-described right cover 201, front cover 202, and toner cover 203.

Figure 3:
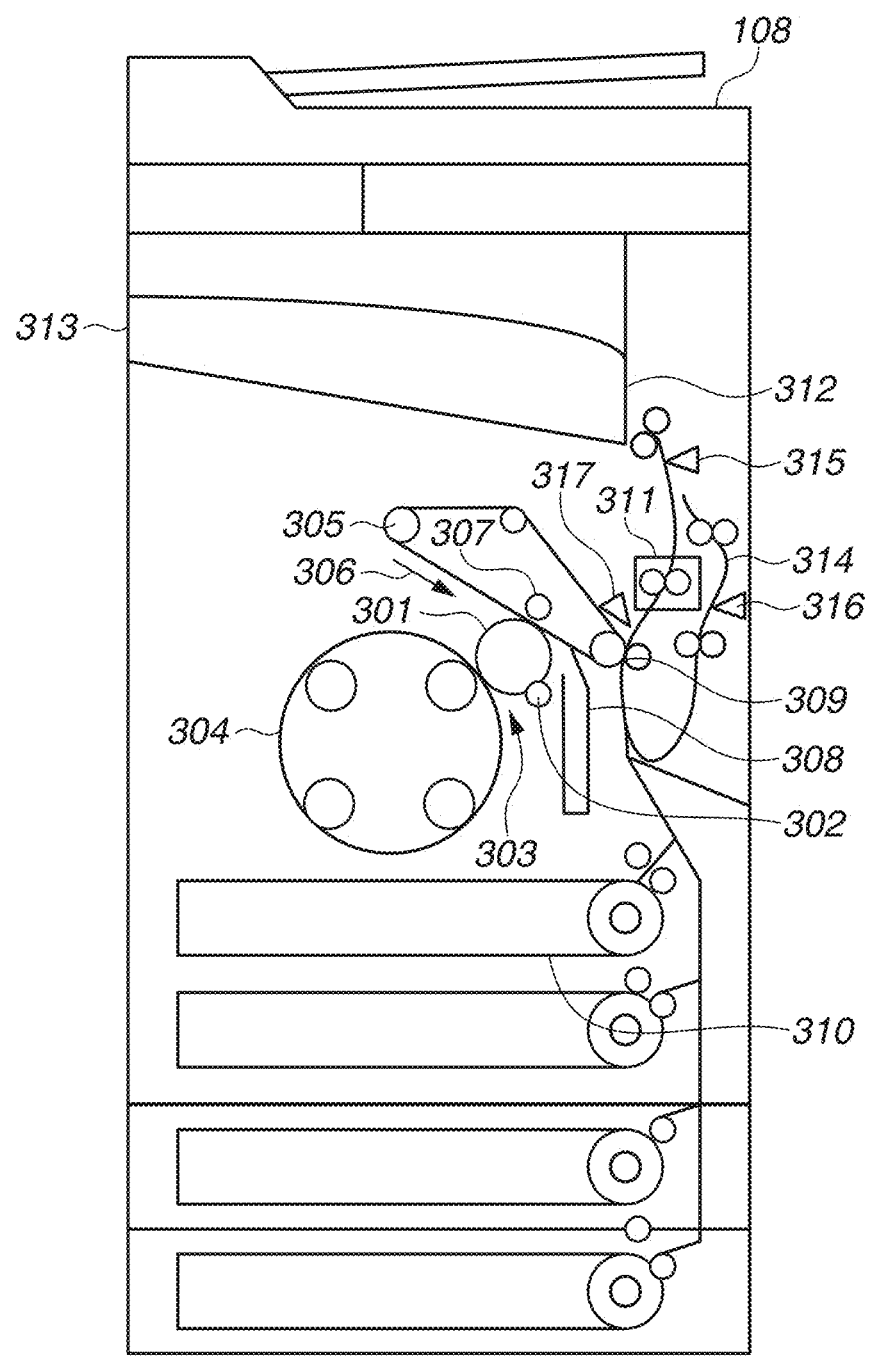
FIG. 3 is a cross-sectional view illustrating an internal configuration of the image processing apparatus according to the present exemplary embodiment.

FIG. 3 is a cross-sectional view illustrating an internal configuration of the image processing apparatus 100. FIG. 3 illustrates one example of an internal configuration of a full-color image processing apparatus that uses, for example, cyan, magenta, yellow, and black (CMYK).

A photosensitive drum 301 is subjected to charging processing so as to have a specific polar potential by a primary charger 302 and is exposed by a not-illustrated exposure unit. An electrostatic latent image corresponding to, for example, K is formed in this manner.

A rotary development device 304 includes four development devices integrated with respective toner cartridges. After the electrostatic latent image is formed, an image corresponding to K is developed on the photosensitive drum 301 by one of the development devices of the rotary development device 304.

An intermediate transfer belt 305 is driven in a direction indicated by an arrow 306. The image developed on the photosensitive drum 301 is transferred onto the intermediate transfer belt 305 in the course of passing through a portion where the photosensitive drum 301 and the intermediate transfer belt 305 are joined to each other. A surface of the photosensitive drum 301 after the transfer onto the intermediate transfer belt 305 ends is cleaned by a cleaning device 308. A color image is formed by sequentially repeating this processing to superimpose images in the four colors (magenta, cyan, yellow, black) onto one another on the intermediate transfer belt 305. When a monochrome image is formed, the transfer processing is performed only once.

The image transferred onto the intermediate transfer belt 305 is printed onto paper fed from a cassette 310 at a portion where a secondary transfer roller 309 is located. The paper with the image printed thereon is heated by a fixation device 311, by which the image is fixed onto the paper. After the fixation, the paper is conveyed to a paper output port 313 and discharged out of the apparatus by a roller 312. When two-sided printing is conducted, the paper passes through a reversing path 314, and the print processing is repeated. The secondary transfer roller 309 and the fixation device 311 are prepared as a single unit called a transfer unit, and the user can extract the unit when removing the jammed paper.

A conveyance portion sensor 315, a two-sided portion sensor 316, and a transfer portion sensor 317 each function to detect whether the print paper is left at the corresponding portion. These sensors detect occurrence of the jam. Each of these sensors can be a sensor using a mechanical flag or a sensor using an optical element. In addition to the conveyance portion sensor 315, the two-sided portion sensor 316, and the transfer portion sensor 317, a plurality of other sensors (not illustrated) is also mounted in the image processing apparatus 100.

The internal configuration of the image processing apparatus 100 is not limited to FIG. 3, and can be any configuration that forms the image data onto the paper.

FIGS. 4A to 4C illustrate a moving image list table 400, a moving image table 410, and a sensor position Bit table 420 stored in the storage 111 illustrated in FIG. 1. In the present exemplary embodiment, the moving image list table 400, the moving image table 410, and the sensor position Bit table 420 are stored in the storage 111 of the image processing apparatus 100. However, the above-described tables 400, 410, and 420 can be assumed to be stored in, for example, a server connected to the image processing apparatus 100 via a network or the like.

FIG. 4C illustrates the sensor position Bit table 420. The sensor position Bit table 420 is a table that indicates a correspondence between a sensor 421 and a sensor position Bit 422.

The sensor 421 indicates a name of the sensor mounted inside the image processing apparatus 100. The sensor position Bit 422 indicates a number of a Bit corresponding to the sensor 421. When the sensor 421 detects that, for example, the print paper is left, the CPU 101 sets the Bit corresponding to this sensor 421 to ON. The CPU1 101 determines whether the jam has occurred in the image processing apparatus 100 by determining whether respective Bits are set to ON or OFF.

If the jam is detected at the conveyance portion by the conveyance portion sensor 315, a Bit 1 is set to ON. If the jam is detected at the two-sided portion by the two-sided portion sensor 316, a Bit 2 is set to ON. If the jam is detected at the transfer portion by the transfer portion sensor 317, a Bit 3 is set to ON.

A cover 424 indicates which cover of the image processing apparatus 100 is a cover that leads to each of the sensors 421 when being opened.

FIG. 4A illustrates the moving image list table 400. The moving image list table 400 is a table that defines an association between a maintenance event (the jam, a lack of the toner, and the like) and moving images that should be played back when occurrence of this maintenance event is detected. The maintenance event indicates the reason for which the user needs to carry out maintenance work, such as the jam and the lack of the toner. A maintenance identification (ID) 401, a corresponding sensor position Bit 402, and a moving image list 403 are stored in association with one another in the moving image list table 400. The maintenance ID 401 is a number for identifying the maintenance event that occurs in the image processing apparatus 100.

In FIG. 4A, a maintenance event with a maintenance ID 401 of "001" is the jam at the conveyance portion, and is the jam detected when the Bit 1 (the conveyance portion sensor 315) is set to ON.

A maintenance event with a maintenance ID 401 of "002" is the jam at the transfer portion, and is the jam detected when the Bit 3 (the transfer portion sensor 317) is set to ON.

A maintenance event with a maintenance ID 401 of "003" is a jam detected when pieces of paper are left at both the conveyance portion and the transfer portion or when the paper is left at a position extending across the conveyance portion and the transfer portion.

A maintenance event with a maintenance ID 401 of "004" is the jam at the two-sided portion, and is the jam detected when the Bit 2 is set to ON.

A maintenance event with a maintenance ID 401 of "005" is a lack of cyan toner, and is detected by the printer device 106.

The moving image list 403 indicates the moving images that should be played back when each maintenance event has occurred. When the maintenance event occurs, a series of work processes required for resolving the maintenance event should be presented to the user. The series of work processes includes a plurality of work processes, such as opening the cover, removing the jammed paper, and closing the cover. In the present exemplary embodiment, the image processing apparatus 100 does not prepare a single moving image indicating the series of work processes for each maintenance event in advance, but prepares a short moving image for each work process in advance and presents the series of work processes to the user by combining a plurality of these moving images. In the following description, the moving image for each work process will be referred to as a "partial moving image".

Some work is common for each maintenance event. For example, "opening the right cover 201" and "closing the opened cover" are work processes performed in common when a plurality of maintenance events is resolved. Generating the maintenance moving image using the partial moving image can reduce a storage capacity necessary to store the moving image compared to generating the maintenance moving image for each maintenance event.

Each of the maintenance IDs 401, a combination of partial moving images corresponding to this maintenance ID 401, and a playback order thereof are stored in the moving image list 403. The combination of partial moving images is information indicating which partial moving images are displayed in combination when the maintenance event corresponding to each of the maintenance IDs 401 occurs. For example, if the maintenance event with the maintenance ID 401 of "001" occurs, partial moving images A1, A2, A3, and A6 are displayed on the display device 115. The playback order is an order in which the partial moving images are displayed, and the partial moving images are displayed in an order of A1, A2, A3, and A6 if the maintenance event with the maintenance ID 401 of "001" occurs.

FIG. 4B illustrates the moving image table 410. The moving image table 410 is a table that associates a moving image ID 411, a moving image file 412, a recording time 413, a cover open/close flag 414, and a message 415 with one another.

The moving image ID 411 is an ID for identifying the partial moving image, and is used in the moving image list 403 in the above-described moving image list table 400. The moving image file 412 indicates a filename of the partial moving image to be played back and where a partial moving image file is stored in the storage 111. In the present exemplary embodiment, the image processing apparatus 100 is described assuming that the partial moving image file is stored in the storage 111. However, the image processing apparatus 100 can be configured in such a manner that the partial moving image file is stored in advance in an external apparatus, such as a server connected via a network and a storage device connected via a universal serial bus (USB) cable, and the CPU 101 reads out this file when necessary.

The recording time 413 indicates a time period required from a start to an end of playback of the partial moving image.

The cover open/close flag 414 is a flag indicating whether the partial moving image identified by the moving image ID 411 is a moving image indicating work to be carried out before the cover of the image processing apparatus 100 is opened or a moving image indicating work to be carried out after the cover of the image processing apparatus 100 is opened. The cover open/close flag 414 set to 0 means that the moving image is the moving image indicating work to be carried out before the cover is opened, and the cover open/close flag 414 set to 1 means that the moving image is the moving image indicating work to be carried out after the cover is opened.

The message 415 indicates a message to be displayed in a message display region 508, which will be described below, when the CPU 101 is playing back the corresponding partial moving image.

The work indicated in each of the partial moving image files is as follows.

The partial moving image A1 is a moving image indicating the work of opening the right cover 201.

The partial moving images A2 and A3 are moving images indicating work of removing the jammed paper around the conveyance portion sensor 315, and partial moving images A4 and A5 are moving images indicating work of removing the jammed paper around the transfer portion sensor 317.

The partial moving image A6 is a moving image indicating work of closing the right cover 201.

A partial moving image A7 is a moving image indicating work of opening the front cover 202.

A partial moving image A8 is a moving image indicating work of closing the front cover 202.

A partial moving image A9 is a moving image indicating work for removing the jammed paper around the two-sided portion sensor 316.

A partial moving image B1 is a moving image indicating work of opening the toner cover 203. A partial moving image B2, a partial moving image B3, and a partial moving image B4 are moving images indicating work of unloading an empty magenta toner cartridge, work of preparing a new magenta toner cartridge, and work of loading the new magenta toner cartridge, respectively.

A partial moving image B5, a partial moving image B6, and a partial moving image B7 are moving images indicating work of unloading an empty cyan toner cartridge, work of preparing a new cyan toner cartridge, and work of loading the new cyan toner cartridge, respectively.

A partial moving image B8, a partial moving image B9, and a partial moving image B10 are moving images indicating work of unloading an empty yellow toner cartridge, work of preparing a new yellow toner cartridge, and work of loading the new yellow toner cartridge, respectively.

A partial moving image B11, a partial moving image B12, and a partial moving image B13 are moving images indicating work of unloading an empty black toner cartridge, work of preparing a new black toner cartridge, and work of loading the new black toner cartridge, respectively.

A partial moving image B14 is a moving image indicating work of closing the toner cover 203.

Referring back to FIG. 4A, an example of the moving image list 403 is described. If the jam at the conveyance portion occurs (the maintenance ID 401 is 001), the partial moving image A1 indicating the work of opening the right cover 201 is played back first. Then, the partial moving images A2 and A3 indicating the work of removing the jammed paper around the conveyance portion sensor 315 and the partial moving image A6 indicating the work of closing the right cover 201 are played back sequentially.

FIGS. 5A to 5C and 6A to 6C illustrate examples of screens displayed on the display device 115 according to the present exemplary embodiment. A transition of the display screen according to the present exemplary embodiment will be described with reference to FIGS. 5A to 5C and 6A to 6C.

Figure 5A:
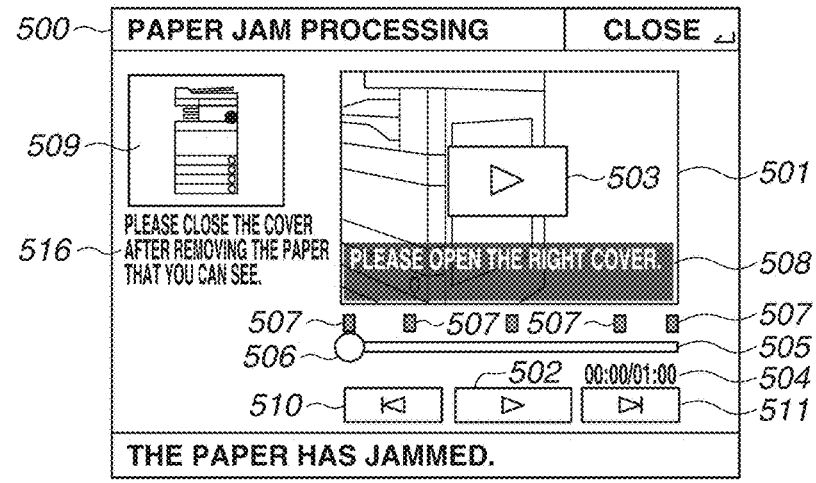
FIGS. 5A, 5B, and 5C illustrate examples of screens on a display device 115 according to the present exemplary embodiment.
Figure 5B:
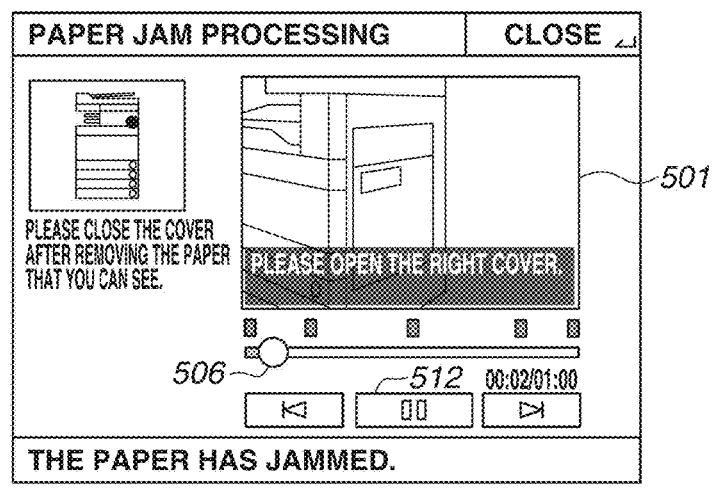
Figure 5C:
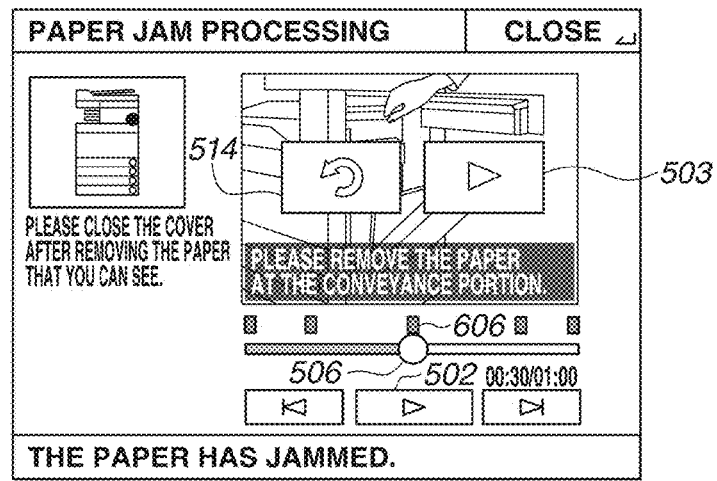

The CPU 101 executes the program stored in the storage 111, by which display data of a screen 500 illustrated in FIGS. 5A to 5C is generated. The generated display data is displayed on the display device 115 via the display control unit 114.

FIG. 5A illustrates an example of a screen displayed first when the sensor in the image processing apparatus 100 detects occurrence of the maintenance event. In the present example, this screen will be described supposing that the image processing apparatus 100 detects occurrence of the jam at the conveyance portion (the maintenance ID 401 is "001").

When the maintenance ID 401 detected by the image processing apparatus 100 is "001", the respective partial moving images with the moving image IDs 411 of A1, A2, A3, and A6 are played back sequentially. FIG. 5A illustrates the screen in such a state that the moving image indicating the maintenance work is stopped at the beginning of the partial moving image A1 played back first.

Items displayed on the screen 500 include the moving image display region 501, a playback button 502, a playback mark 503, a playback time/duration display label 504, a bar 505, a slider 506, stop positions 507, a message display region 508, and an icon 509. The items displayed on the screen 500 also include a previous stop position skip button 510 for moving a playback position from a current playback position to a stop position 507 immediately before that, and a next stop position skip button 511 for moving the playback position from the current playback position to a stop position 507 immediately after that.

The moving image display region 501 is a first display region and a region for displaying the moving image indicating the work for resolving the maintenance event. The playback button 502 is a button the user uses to instruct the image processing apparatus 100 to play back the moving image displayed in the moving image display region 501. The playback mark 503 is a mark the user uses to instruct the image processing apparatus 100 to play back the moving image, similar to the playback button 502. The playback mark 503 is displayed while being superimposed on the moving image displayed in the moving image display region 501. If the user presses (touches) the playback button 502 or the playback mark 503, the CPU 101 starts playback of the moving image displayed in the moving image display region 501.

The playback time/the recording time display label 504 is an item indicating a sum of the recording time 413 of the plurality of partial moving images to be played back (referred to as a "total recording time"), and a time corresponding to the current playback position with respect thereto.

The bar 505 and the slider 506 form a seek bar for indicating the playback position in the entire moving image and also enabling the user to instruct the image processing apparatus 100 to move the playback position. The bar 505 schematically illustrates the total recording time. The slider 506 indicates the current playback position and enables the user to instruct the image processing apparatus 100 to move the playback position. The slider 506 moves within a range of the bar 505 according to a playback state of the moving image. The user can move the playback position to an arbitrary position by dragging (moving) the slider 506. Pressing an arbitrary position along the bar 505 can advance the playback of the moving image to this position, and the slider 506 also moves according to this playback position. The stop positions 507 indicate positions at which the moving image is chaptered, and the playback of the moving image is automatically stopped when the moving image is played back as far as these positions.

The playback time/the recording time display label 504 and the stop positions 507 will be described more specifically. If the maintenance event with the maintenance ID 401 of "001" occurs, the partial moving images A1, A2, A3, and A6 are played back sequentially based on the moving image list table 400. The recording time 413 of these partial moving images A1, A2, A3, and A6 are 10 seconds (00:10), 20 seconds (00:20), 20 seconds (00:20), and 10 seconds (00:10), respectively, according to the moving image table 410. The total recording time is the sum of the recording times 413 of the partial moving images to be played back, and therefore is 1 minute and 00 seconds (01:00) in this case. The playback time indicates the current playback position with respect to the total recording time. For example, suppose that the image processing apparatus 100 is displaying a scene after 5 seconds (00:05) have passed from the beginning of the partial moving image A1 that is the first partial moving image to be played back. In this case, the playback time is 5 seconds. Suppose that the image processing apparatus 100 is displaying a scene after 10 seconds have passed from the beginning of the partial moving image A2 that is the second partial moving image to be played back. In this case, since the playback of the partial moving image A1 has been ended, the playback time is determined to be 20 seconds by adding the recording time 413 of the partial moving image A1, which is 10 seconds, and the time period for which the partial moving image A2 has been already played back, which is 10 seconds. The playback time/duration display label 504 displays the playback time and the total recording time calculated in the above-described manner as a character string formed by connecting them with a slash (/).

The stop positions 507 are displayed at the positions where the moving image is chaptered in the series of work processes. When the moving image being played back is played back as far as the stop positions 507, the moving image is automatically stopped. In FIG. 5A, the stop positions 507 are three positions that are points where the partial moving image being played back is switched (between A1 and A2, between A2 and A3, and between A3 and A6). The stop positions 507 can be positions including two positions at the beginning and the end of the entire moving image in addition to the positions where the moving image is chaptered in the series of work processes. In the present exemplary embodiment, the stop position 507 is assumed to be the position where the moving image being played back is switched from some partial moving image to the next partial moving image. However, the stop position 507 is not limited to the above-described positions. For example, the partial moving images A1 and A2 can be successively played back and the stop position 507 can be placed between the partial moving images A2 and A3.

FIG. 5A illustrates an example in which the stop positions 507 are the five positions that are the points where the partial moving image being played back is switched, and the beginning and the end of the entire moving image.

The previous stop position skip button 510 and the next stop position skip button 511 are buttons for moving the playback position of the moving image to the stop positions 507 immediately before and after the current playback position, respectively. For example, if the next stop position skip button 511 is pressed when the playback time is 00:00, the playback position and the slider 506 move to the stop position 507 where the playback time is 00:10. If the previous stop position skip button 510 is pressed when the playback time is 01:00, the playback position and the slider 506 move to the stop position 507 where the playback time is 00:50.

A message complementing a content of the partial moving image being played back is displayed in the message display region 508. More specifically, when the partial moving image A1 is being played back, a message "please open the right cover" is displayed based on the message 415 in the moving image table 410. The message display region 508 can be hidden after a predetermined time period has passed since a start of playback of the corresponding partial moving image or can be kept displayed as long as the corresponding partial moving image is being displayed.

The icon 509 is an icon indicating a portion where the maintenance event occurred in the image processing apparatus 100. More specifically, if the maintenance ID 401 is "001", the jam at the conveyance portion occurred, so that a colored circle mark is displayed at a position corresponding to the conveyance portion in the icon 509.

A notification region 516 is a region for notifying the user of work required for restarting the detection of the maintenance event by the sensors that detect the maintenance event and restarting the determination whether the maintenance event has occurred in the image processing apparatus 100. The notification region 516 is also a region for notifying the user of work that the user should carry out after removing the jammed paper left in the image processing apparatus 100 when the jam occurred. Examples of the sensors that detect the maintenance event include the conveyance portion sensor 315, the two-sided portion sensor 316, the transfer portion sensor 317, and a not-illustrated sensor for detecting the lack of the toner. Besides the above-described sensors, the image processing apparatus 100 also includes a plurality of other sensors for detecting the maintenance event.

If the playback button 502 or the playback mark 503 is pressed on the screen 500 illustrated in FIG. 5A, the playback of the moving image is started. If the maintenance ID 401 is "001", the CPU 101 starts playback of the partial moving image A. FIG. 5B illustrates an example of a screen after 2 seconds have passed since the start of the playback of the partial moving image A1. The playback button 502 and the playback mark 503 are hidden according to the start of the playback of the moving image, and, in replacement of the playback button 502, a pause button 512 is displayed at the same position.

FIG. 5C illustrates an example of a screen when the playback position reaches as far as the end of the partial moving image A2. The playback of the moving image is automatically paused at a time point that playback of the partial moving image A2 ends, i.e., at a position where a stop position 606 is placed. Then, a replay mark 514 is displayed together with the playback mark 503. The pause button 512 is hidden, and the playback button 502 is displayed at the position where the pause button 512 used to be displayed. The replay mark 514 is a mark for instructing the image processing apparatus 100 to play back the currently stopped partial moving image from the beginning thereof. Specifically, if the replay mark 514 is pressed while the moving image is stopped at the position where the stop position 606 is placed, the CPU 101 moves to the beginning of the partial moving image A2 and restarts the playback of the moving image therefrom. The stop position 507 is placed for each of the work processes, and the playback of the moving image is automatically paused at a time point that the playback as far as the stop position 507 ends. This arrangement prevents the moving image indicating the next work from being inconveniently played back regardless of the user's intention. When the moving image is paused, the replay mark 514 is displayed together with the playback mark 503, whereby the user can easily select whether to play back the moving image indicating the next work or recheck once more the moving image indicating the work that has been already played back.

If the playback mark 503 or the playback button 502 is pressed on the screen 500 illustrated in FIG. 5C, playback of the partial moving image A3 is started.

Figure 6A:
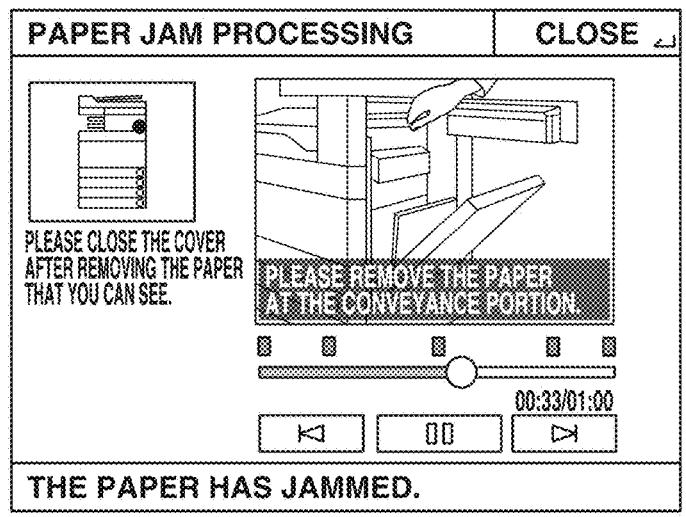
FIGS. 6A, 6B, and 6C illustrate examples of screens on the display device 115 according to the present exemplary embodiment.

FIG. 6A illustrates an example of a screen after 3 seconds have passed since the start of the playback of the partial moving image A3.

Figure 6B:
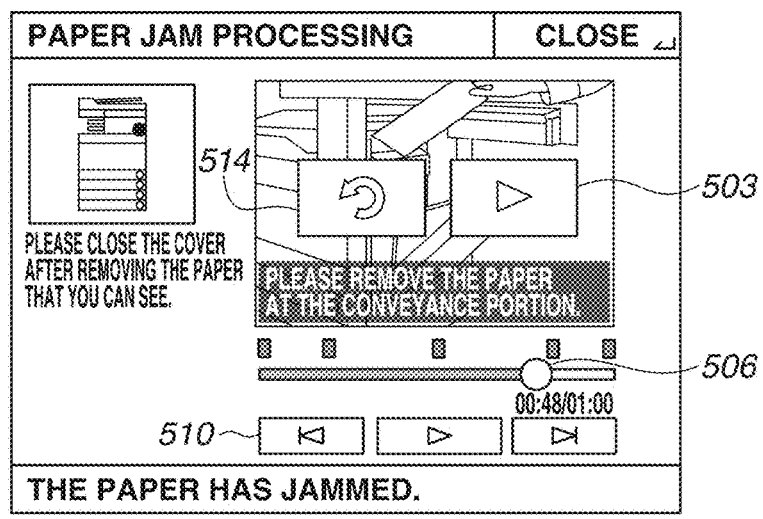

FIG. 6B illustrates an example of a screen when the pause button 512 or the moving image display region 501 is pressed while the partial moving image A3 is being played back. When the pause button 512 or the moving image display region 501 is pressed, the playback of the moving image is stopped, and the replay mark 514 is displayed together with the playback mark 503.

Figure 6C:
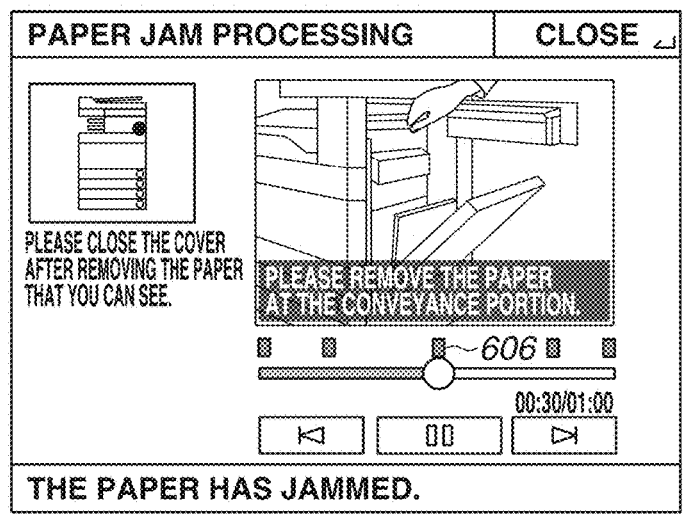

FIG. 6C illustrates an example of a screen displayed when the replay mark 514 or the previous stop position skip button 510 is pressed on the screen 500 illustrated in FIG. 6B. When the replay mark 514 or the previous stop position skip button 510 is pressed, the slider 506 and the playback position move to the stop position 606 placed at the beginning of the partial moving image A3, and the playback of the moving image resumes.

In this manner, even when the moving image is paused according to the user's intentional operation, the replay mark 504 is also displayed together with the playback mark 503 similar to when the moving image is automatically paused due to the end of the playback of the partial moving image.

FIG. 7 is a flowchart illustrating processing for displaying the maintenance work performed by the CPU 101. A program for performing the processing illustrated in FIG. 7 is stored in the storage 111.

First, in step S701, the CPU 101 determines whether the maintenance event has occurred. The printer control unit 105 detects the maintenance event at any of the above-described conveyance portion sensor 315, two-sided portion sensor 316, transfer portion sensor 317, and not-illustrated another sensor. Based on detection of the maintenance event, the CPU 101 sets the Bit corresponding to the sensor that detected the maintenance event to ON. Then, an operation of detecting the maintenance event by the sensors mounted for detecting the maintenance event is stopped. Stopping the operation of detecting the maintenance event by the sensors prohibits the printer control unit 105 from detecting the maintenance event.

If the CPU 101 has set any Bit to ON (YES in step S701), in step S702, the CPU 101 determines which maintenance event has occurred, and identifies the maintenance ID 401. For example, suppose that jams have occurred at two portions, the conveyance portion and the two-sided portion. Then, since the Bit 1 and the Bit 2 are set to ON, the CPU 101 identifies the maintenance ID 401 of the maintenance event that occurred as "003" based on the moving image list table 400 illustrated in FIG. 4A.

In step S703, the CPU 101 refers to the moving image list table 400, and reads in the list of partial moving images corresponding to the identified maintenance ID 401. Then, in step S704, the CPU 101 acquires the partial moving images stored in the storage 111 according to the read list of partial moving images. For example, if the identified maintenance ID 401 is "003", the partial moving images to be played back are A1, A2, A3, A9, and A6. The CPU 101 temporarily stores the plurality of identified partial moving images in the playback order thereof into the RAM 104 as, for example, array information.

In step S705, the CPU 101 determines whether all of the partial moving images in the list read in step S703 have been acquired. If the CPU 101 has not acquired all of the partial moving images (NO in step S705), in step S704, the CPU 101 acquires a partial moving image that has not been acquired yet.

If the CPU 101 has acquired all of the necessary partial moving images (YES in step S705), in step S706, the CPU 101 calculates the total recording time of the moving image. The CPU 101 acquires the recording time 413 of each of the partial moving images acquired in step S704 from the moving image table 410, and calculates a sum of them. Then, the CPU 101 displays the playback time/duration display label 504 based on the calculated total recording time.

In step S707, regarding the partial moving image identified by the first moving image ID 411, the CPU 101 outputs the beginning of the partial moving image to the display device 115 in the stopped state. Then, in step S708, the CPU 101 outputs the playback mark 503 and the playback button 502 to the display device 115. Displaying the partial moving image at the beginning on the display device 115 in the stopped state prevents the moving image indicating the work for resolving the maintenance event from suddenly being displayed on the display device 115, and thus the user from accidentally missing the moving image indicating the first work.

In step S709, the CPU 101 displays the work required for restarting the determination whether the maintenance event has occurred in the notification region 516. The work required for restarting the determination whether the maintenance event has occurred is, for example, "please close the cover after removing the paper that you can see" illustrated in FIG. 5A. In other words, the CPU 101 displays in the notification region 516 the work that the user should carry out after the jammed paper is removed from inside the image processing apparatus 100.

The work for instructing the image processing apparatus 100 to determine whether the maintenance event has occurred means work for restarting the detection, which causes the image processing apparatus 100 to restart the detection of the maintenance event by the sensors that detect the maintenance event. Examples of the work for restarting the detection include the above-described closing the predetermined cover, and connecting an external apparatus connectable to the image processing apparatus 100 to the image processing apparatus 100. The work for restarting the detection is not limited to the above-described examples, and can be any work capable of causing the CPU 101 to restart the detection of the maintenance event by the sensors that detect the maintenance event in the image processing apparatus 100 according to the user's execution of the work.

Displaying the work for restarting the detection of the maintenance event by the sensors in step S709 enables the user to understand the work for restarting the detection of the maintenance event even without viewing the moving image for resolving the maintenance event to the end. Even if the user is performing the operation without viewing the moving image indicating the above-described work displayed on the display device 115, the user can understand the work that the user should carry out after removing the cause for the maintenance event.

In step S710, the CPU 101 detects whether the user has carried out the work for restarting the detection with the moving image displayed in the moving image display region 501 on the display device 115. For example, if the work for detecting the maintenance event is "closing the right cover 201", the image processing apparatus 100 determines that the work for restarting the detection has been carried out (YES in step S710) if detecting that the right cover 201 has been closed using the sensor for detecting the opening/closing of the cover that is mounted at the right cover 201.

If the work for restarting the detection has been carried out (YES in step S710), in step S711, the CPU 101 sets all of the Bits to OFF, thereby preventing the maintenance event from being detected. Then, the CPU 101 discards the partial moving images stored in the RAM 104. A phrase "resetting the Bit" will be used to refer to an operation of the CPU 101 setting the Bit to OFF regardless of a result of the detection by the sensor. When the Bits are reset, each of the Bits is set to OFF regardless of the result of the detection by the sensor. Then, CPU 101 determines ON or OFF of the Bit by reflecting a result of the detection by the sensor at that time.

In step S712, the CPU 101 restarts the detection of the maintenance event by the sensors that detect the maintenance event. Then, only the Bit of the sensor located at a position where the occurrence of the maintenance event continues is set to ON.

After the CPU 101 restarts the detection by the sensors mounted for detecting the maintenance event, in step S701, the CPU 101 determines whether the maintenance event has occurred in the image processing apparatus 100. If the maintenance event has occurred (YES in step S701), the CPU 101 continuously performs the processing in step S702 and the steps subsequent thereto, and identifies the maintenance ID 401 of the maintenance event that has occurred.

For example, suppose that jams have occurred at both the conveyance portion and the two-sided portion, and the user removes only the jam that occurred at the conveyance portion and closes the right cover 201. The CPU 101 restarts the detection by the sensors that detect the maintenance event after the right cover 201 is closed, and detects whether the maintenance event has occurred. At this time, the Bit 1 is set to OFF since the jam at the conveyance portion has been resolved. The Bit 2, however, is set to ON since the jam at the two-sided portion has not been resolved. Since there is the Bit set to ON, the CPU 101 determines that the maintenance event has occurred (YES in step S701), and the processing proceeds to step S702. In step S702, the CPU 101 identifies the maintenance ID 401 as 004, and acquires and plays back the partial moving images corresponding to the maintenance ID 401.

Operating in this manner enables the display device 115 to display the work for resolving the jam at the two-sided portion without displaying the work for resolving the jam at the conveyance portion that was previously resolved. Therefore, the user does not have to view the moving image indicating the work corresponding to the previously resolved maintenance event.

If the maintenance event has not occurred in the image processing apparatus 100 (NO in step S701), the display of the work for resolving the maintenance event ends.

The CPU 101 calculates the total recording time using the recording time 413 in the moving image table 410 in step S706, but does not have to use the recording time 413. More specifically, the CPU 101 can be configured to read the plurality of corresponding partial moving images into the RAM 104, calculate the recording time of each of the partial moving images from a framerate and a total number of frames of the corresponding one of the partial moving images, and calculate the total recording time from this value.

A format and a codec of the moving image are not limited by the present exemplary embodiment, and various formats and codecs can be employed for the moving image.

FIG. 8 is a flowchart illustrating processing regarding the playback of the moving image after the CPU 101 performs the processing indicated in steps S701 to S709. A program for causing the CPU 101 to perform the processing illustrated in FIG. 8 is stored in the storage 111.

In step S801, the CPU 101 determines whether the playback button 502 or the playback mark 503 is pressed. Until the playback button 502 or the playback mark 503 is pressed, the CPU 101 does not play back the moving image and displays the moving image on the display device 115 in the stopped state.

If the playback button 502 or the playback mark 503 is pressed in step S801 (YES in step S801), in step S802, the CPU 101 starts the playback of the moving image according thereto.

By performing the processing illustrated in FIG. 7, the image processing apparatus 100 notifies the user of the work for restarting the detection by the sensors that detect the maintenance event before displaying the last work for resolving the maintenance event in the moving image display region 501. As a result, the user can understand the work for restarting the detection by the sensors even without viewing the work for resolving the maintenance event to the end after the maintenance event has occurred. For example, the image processing apparatus 100 notifies the user of the work that the user should carry out after removing the jammed paper from the image processing apparatus 100, separately from the procedure that the user should perform to remove the jammed paper, based on occurrence of the jam.

In the first exemplary embodiment, the image processing apparatus 100 notifies the user of the work for restarting the detection by the sensors that detect the maintenance event together with the work for resolving the maintenance event regardless of which maintenance event has occurred.

In a second exemplary embodiment, the image processing apparatus 100 notifies the user of the work for restarting the detection by the sensors that detect the maintenance event if the maintenance event that has occurred is a predetermined specific maintenance event. By limiting the maintenance event that leads to the notification, the image processing apparatus 100 can more effectively notify the user of the work required for conducting the detection of the maintenance event again, compared to notifying the user at all maintenance events.

FIG. 9 illustrates the moving image list table 400 according to the second exemplary embodiment. The maintenance ID 401, the corresponding sensor position Bit 402, and the moving image list 403 are similar to the moving image list table 400 illustrated in FIG. 4A, and therefore descriptions thereof are omitted here. A notification flag 404 is a flag indicating whether to display the work for restarting the detection in the notification region 516 if the maintenance event having the corresponding maintenance ID 401 has occurred. If the maintenance event having the maintenance ID 401 corresponding to the notification flag 404 set to ON has occurred, the image processing apparatus 100 displays the work for restarting the detection by the sensors in the notification region 516.

For example, suppose that the jam has occurred at each of the conveyance portion and the two-sided portion. Because the conveyance portion sensor 315 and the two-sided portion sensor 316 detect the respective jams, the Bit 1 and the Bit 2 are set to ON. At this time, the image processing apparatus 100 determines that the maintenance ID 401 of the maintenance event that has occurred is "003". After that, the image processing apparatus 100 displays the work that the user should carry out to resolve the corresponding jam at the conveyance portion and the work that the user should carry out to resolve the jam at the two-sided portion, on the display device 115. When opening the right cover 201 and removing the jammed paper at the conveyance portion according to the moving image, the user can also remove the jammed paper at the two-sided portion that the user sees. The work for resolving the jam at the two-sided portion is continuously displayed on the display device 115 despite the fact that the user has removed all of the pieces of jammed paper in the image processing apparatus 100. If the user carries out the work according to the work displayed on the display device 115, this results in a wasteful search for the jammed paper that actually no longer exists, making it impossible for the user to carry out the work displayed on the display device 115. Therefore, the user cannot understand the work that the user should carry out.

In such a case, the image processing apparatus 100 can reduce a possibility that a situation like the above-described example is brought about by notifying the user of the work for restarting the detection that is required for causing the image processing apparatus 100 to restart the detection of occurrence of the maintenance event by the sensors in the notification region 516. For example, in a case like the above-described example, the image processing apparatus 100 notifies the user of the work that the user should carry out after removing all of the pieces of jammed paper that the user sees. Presenting the notification in this manner enables even the user who has removed all of the pieces of jammed paper unexpectedly before this is indicated in the moving image to understand what the user should carry out next.

FIG. 10 is a flowchart illustrating processing for displaying the work for resolving the maintenance event performed by the CPU 101 according to the second exemplary embodiment.

The CPU 101 reads in the program stored in the storage 111 and executes the read program, by which the processing illustrated in FIG. 10 is performed.

In the processing illustrated in FIG. 10, when the above-described sensor detects the maintenance event, the CPU 101 sets the Bit corresponding to the sensor to ON and stores information in the RAM 104. The sensor stops the detection operation for detecting the maintenance event based on detection of the maintenance event.

Processing indicated in steps S701 to S712 is similar to the first exemplary embodiment, and therefore a description thereof is omitted herein.

The CPU 101 performs steps S701 to S708, by which the moving image indicating the procedure for resolving the maintenance event that has occurred is displayed in the moving image playback region 501 on the display device 115.

In step S1001, the CPU 101 determines whether the maintenance event that occurred is the predetermined maintenance event. In the present example, if the notification flag 404 in the moving image list table 400 is set to ON with respect to the maintenance ID 401 corresponding to the detected maintenance event, the CPU 101 determines that the detected maintenance event is the specific maintenance event (YES in step S1001).

If the maintenance event detected by the CPU 101 is the specific maintenance event (YES in step S1001), in step S709, the CPU 101 displays the work for restarting the detection in the notification region 516.

If the maintenance event detected by the CPU 101 is not the specific maintenance event (NO in step S1001), the CPU 101 does not display the work for restarting the detection in the notification region 516.

Processing in step S710 and steps subsequent thereto is similar to the first exemplary embodiment.

In the second exemplary embodiment, the image processing apparatus 100 has been described assuming that the image processing apparatus 100 determines in advance whether the maintenance event is the maintenance event that leads to the notification of the procedure for restarting the detection by the sensors for each of the maintenance IDs 401, and displays the work for restarting the detection by the sensors if the maintenance event having the predetermined maintenance ID 401 has occurred in step S1001.

However, the image processing apparatus 100 can be configured in such a manner that the CPU 101 displays the restart work if a predetermined Bit is set to ON. Two Bits can be unintentionally set to ON for a single jam depending on the position of the sensor. For example, two Bits can be set to ON, for example, when a single pieces of jammed paper is left across a plurality of sensors. At this time, the image processing apparatus 100 displays similar work that the user should carry out to the work when pieces of paper are left one by one at each of the sensors, on the display device 115. The user removes the jammed paper according to the displayed work of removing the plurality of pieces of jammed paper. However, when there has only been the single piece of jammed paper, the work for removing the jammed paper is incorrectly continuously displayed on the display unit despite the fact that the user has removed the jammed paper. In the above-described manner, the Bit of the sensor located at such a position that two sensors inappropriately react for a single jam is handled as the predetermined Bit. Operating in this manner enables the user to understand the work for restarting the detection of the maintenance event even without viewing the work incorrectly displayed after the maintenance event has been resolved to the end.

The image processing apparatus 100 can be configured to notify the user of the work for restarting the detection when the Bit in a specific cover is set to ON. The specific cover refers to a cover where a single cover leads to a plurality of sensors mounted for detecting the maintenance event when opened. In this case, in step S1001, the CPU 101 identifies which cover is the cover that leads to the sensor that detected the maintenance event when being opened based on the sensor position Bit table 420. If the cover identified based on the sensor position Bit table 420 is the specific cover (YES in step S1001), the CPU 101 displays the work for restarting the sensors in the notification region 516.

The image processing apparatus 100 can be configured in such a manner that the CPU 101 issues the restart notification if respective maintenance events with a plurality of maintenance IDs have occurred. At this time, in step S1001, the CPU 101 determines whether respective maintenance events with a plurality of maintenance IDs have occurred.

The image processing apparatus 100 can effectively notify the user of the work for restarting the detection by notifying the user of the work required for restarting the determination whether the maintenance event has occurred only when the predetermined maintenance event has occurred in the above-described manner. The image processing apparatus 100 can notify the user of the work to be carried out when the maintenance event has been resolved only for a maintenance event raising a high possibility that the user can lose track of the work to be carried out next if carrying out the work while viewing the image displayed on the display device 115.

Next, a third exemplary embodiment will be described focusing on differences from the first and second exemplary embodiments. In the first and second exemplary embodiments, when the maintenance event has occurred, the CPU 101 displays the work for restarting the detection by the sensors that detect the maintenance event in the notification region 516 from the beginning. Therefore, the content that the user is notified of in the notification region 516 can fail to correspond to a current state of the image processing apparatus 100, thereby inconveniently confusing the user. This risk will be described now referring to, for example, a case where the work that the user is notified of in the work notification region 516 is "please close the right cover". When the user is about to start the maintenance, the right cover 201 of the image processing apparatus 100 is closed. If the message "please close the right cover" is displayed in the notification region 516, the user views the screen 500 where the work impossible to be carried out is displayed and ends up confused. Therefore, the present exemplary embodiment describes as an exemplary embodiment in which the image processing apparatus 100 displays the work for restarting the detection by the sensors at least after the work to be displayed in the work notification region 516 becomes able to be carried out.

FIG. 11 is a flowchart illustrating processing for displaying the work for resolving the maintenance event that is performed by the CPU 101 according to the third exemplary embodiment.

A program for performing the processing illustrated in FIG. 11 is stored in the ROM 102 or the like, and the CPU 101 reads out this program and executes the read program, by which the processing illustrated in FIG. 11 is performed.

Steps 701 to 712 are similar processing to the first exemplary embodiment, and therefore descriptions thereof are omitted herein.

The CPU 101 performs steps from S701 to S708, thereby displaying the moving image indicating the work for resolving the maintenance event in the moving image display region 501. After displaying the moving image, in step S1101, the CPU 101 determines whether the work for restarting the detection by the sensors that detect the maintenance event can be carried out.

If the work for restarting the detection by the sensors becomes able to be carried out (YES in step S1101), in step S709, the CPU 101 displays the work for restarting the detection by the sensors in the notification region 516. If the work for restarting the detection by the sensors cannot be carried out (NO in step S1101), the work for resolving the maintenance event is continuously displayed in the moving image display region 501.

For example, suppose that the jam has occurred at the conveyance portion. The maintenance ID 401 of the jam at the conveyance portion is 001, and the detection by the sensors that detect the maintenance event is started by closing the right cover 201. Carrying out the work of opening the right cover 201 enables carrying out the work of closing the right cover 201. Upon detecting that the right cover 201 has been opened using the sensor mounted around the right cover 201, the CPU 101 presents the notification "please close the right cover after removing the jammed paper that you can see" in the notification region 516 according to this detection.

In the third exemplary embodiment, the user is kept notified of the work for restarting the detection by the sensors in the notification region 516 until carrying out the work for restarting the detection by the sensors, after becoming able to carry out the work for restarting the detection by the sensors that detect the maintenance event. Then, the above-described notification is constantly displayed while the display of the image indicating the work for resolving the maintenance event continues. However, the image processing apparatus 100 can be configured to notify the user of the work for restarting the detection by the sensors once when the work for restarting the detection by the sensors that detect the maintenance event becomes able to be carried out, and delete the notification after that.

By performing the processing illustrated in FIG. 11, the image processing apparatus 100 can prevent confusion on the part of the user due to the ill-timed display of the work for restarting the detection by the sensors in the notification region 516 when the work for restarting the detection by the sensors that detect the maintenance event cannot be carried out.

In the third exemplary embodiment, when the work for restarting the detection by the sensors becomes able to be carried out, the image processing apparatus 100 displays the work for updating the work for restarting the detection in the notification region 516 according thereto regardless of which maintenance event has occurred. However, the user can be notified of the work for restarting the detection by the sensors only when a predetermined maintenance event has occurred, similar to the second exemplary embodiment.

OTHER EMBODIMENTS

In the first to third exemplary embodiments, the moving images (the partial moving images), each of which is prepared for each work process, are combined into the moving image indicating the series of work processes, and are displayed on the display device 115. The image processing apparatus 100 can store in advance the moving image indicating the series of work processes that the user should carry out when the maintenance event occurs in the storage 111 for each maintenance event. The method for notifying the user of the maintenance work is not limited to the moving image, and can be realized using an image and/or an animation indicating the maintenance work.

In the first to third exemplary embodiments, the work that the user should carry out is displayed on the display device 115 based on occurrence of the maintenance event. However, the image processing apparatus 100 can be assumed to display the work that the user should carry out when the maintenance event occurs on the display device 115 and configured to perform the processing described in the present disclosure, even when the maintenance event has not actually occurred. For example, the image processing apparatus 100 can be configured to issue the notification in the notification region 516 when the user voluntarily replaces the toner. More specifically, the image processing apparatus 100 can be configured to display the moving image indicating the work of replacing the toner on the display device 115 and display a statement "please close the toner cover after replacing the toner" in the notification region 516 according to opening of the toner cover 203.

In the first to third exemplary embodiments, after the user carries out the work for restarting the detection, all of the sensors in the image processing apparatus 100 reset the result of the detection of the maintenance event and restart the detection of the maintenance event. However, the image processing apparatus 100 can be configured to determine a corresponding sensor for each work process for restarting the detection in advance, and set the Bit to OFF only with respect to the sensor corresponding to the work for restarting the detection that has been carried out by the user to restart the detection of the maintenance event. For example, if the work for restarting the detection by the sensors is "closing the right cover 201", the detection of occurrence of the maintenance event is restarted only at the conveyance portion sensor 315 and the two-sided portion sensor 316 in correspondence with which the cover 424 is the right cover 201 in the sensor position Bit table 420. The detection of occurrence of the maintenance event is not, however, restarted at the transfer portion sensor 317 for which the corresponding cover 242 is the front cover 202. In this case, in step S712, after determining that the maintenance event has not occurred, the CPU 101 restarts the detection by all of the sensors mounted for detecting the maintenance event.

In the first to third exemplary embodiments, the message display region 508 and the notification region 516 refer to different regions in the screen 500 displayed on the display device 115. However, the message display region 508 and the notification region 516 can be prepared in the same region in the screen 500 displayed on the display device 115. For example, the image processing apparatus 100 can be configured to display the message 415 corresponding to the partial moving image being played back in the message display region 508, and write the work for restarting the detection of occurrence of the maintenance event by the sensors following the message 415.

In the first to third exemplary embodiments, the image processing apparatus 100 has been described assuming that the detection of the maintenance event by the sensors is stopped when the sensor detects occurrence of the maintenance event. However, the image processing apparatus 100 can be configured in such a manner that, when the user carries out predetermined work from among the work processes for resolving the maintenance event, the sensors stop the detection of occurrence of the maintenance event according to this execution. For example, the image processing apparatus 100 can be configured to stop the operation of detecting occurrence of the maintenance event by the sensors when the user performs the operation of opening the cover of the image processing apparatus 100.

In the first to third exemplary embodiments, the image processing apparatus 100 has been described assuming that the sensors that detect the maintenance event stop the operation for the detection when the maintenance event is detected. However, the image processing apparatus 100 can be configured to disable the processing in which the CPU 101 sets the Bit to ON without stopping the operation by the sensors mounted for detecting the maintenance event even after detecting the maintenance event.

In the first to third exemplary embodiments, the image processing apparatus 100 has been described assuming that the image processing apparatus 100 displays the maintenance work on the display device 115 and also notifies the user of the work for restarting the detection by the sensors. However, the image processing apparatus 100 can be configured to notify the user of the work for restarting the detection by the sensors that detect the maintenance event before the display device 115 displays the work for resolving the maintenance event, after the maintenance event is detected.

In the first to third exemplary embodiments, the image processing apparatus 100 has been described assuming that the CPU 101 in the image processing apparatus 100 performs the processing illustrated in FIGS. 7, 8, 10, and 11. However, what performs the processing is not limited to the CPU in the image processing apparatus 100. For example, the image processing apparatus 100 can be configured in such a manner that a computer or the like connected to the image processing apparatus 100 controls the image processing apparatus 100, and a CPU in the computer performs the processing.

In the first to third exemplary embodiments, the printer control unit 105 detects occurrence of the maintenance event, and the CPU 101 sets the Bit to ON with respect to the sensor at the portion where the maintenance event has occurred.

However, the CPU 101 can determine whether the maintenance event has occurred based on the result of the detection acquired by the sensor. In this case, the CPU 101 identifies the sensor where the maintenance event has occurred, and sets the Bit corresponding to this sensor to ON.

In the first and second exemplary embodiments, the notification of the work for restarting the detection is constantly presented when the work for resolving the maintenance event is displayed in the moving image display region 501. However, the image processing apparatus 100 can notify the user of the work for restarting the detection once at a predetermined timing, and delete the notification after that. Examples of the predetermined timing include a timing before the image processing apparatus 100 displays the work for resolving the maintenance event in the moving image display region 501 and a timing when the image processing apparatus 100 displays the first work.

In the above-described exemplary embodiments, the image processing apparatus has been described based on the image processing apparatus 100 including a plurality of functions, such as the copy function and the scanner function, but the present exemplary embodiments can also be applied to an image processing apparatus including less than the plurality of functions.

The processing disclosed in the present exemplary embodiments can also be realized by performing processing that supplies software (a program) capable of realizing the functions of the above-described exemplary embodiments to a system or an apparatus via a network or various kinds of storage media, and causes a computer (or a CPU, a micro processing unit (MPU), or the like) of this system or apparatus to read out and execute the program. In this case, this computer program and a storage medium storing the computer program are deemed to form the image processing apparatus described in the present disclosure.

The present exemplary embodiments are directed to enabling the user to understand the work required for restarting the detection of the maintenance event in the image processing apparatus even without viewing the work for resolving the event requiring the maintenance to the end.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

What is claimed is:

1. A method for controlling an image processing apparatus, the method comprising:
   detecting occurrence of a sheet jam; and
   displaying, based on detecting the occurrence and position of the sheet jam, text concurrently with a moving image indicating at least work to remove the jammed sheet,
   wherein the text includes at least information that indicates work that a user is to carry out after removing the jammed sheet, and does not include information that indicates work where the user opens a cover to access the jammed sheet.

2. The method according to claim 1, wherein the work that the user is to carry out after removing the jammed sheet is to close the cover.

3. The method according to claim 2, wherein the text is displayed in response to detection of the cover having been opened.

4. The method according to claim 1, wherein the work to remove the jammed sheet includes work to open the cover.

5. The method according to claim 1,
wherein, in a case where the sheet jam has occurred at a first position, the moving image and the text are displayed concurrently, and
wherein, in a case where the sheet jam has occurred at a second position different from the first position, the moving image is displayed but the text is not displayed.

6. The method according to claim 1, wherein whether a sheet jam has occurred is determined in response to detection of the work indicated by the text having been carried out.

7. An image processing apparatus comprising:
one or more processors; and
memory storing instructions that, when executed by the one or more processors, cause the image processing apparatus to perform operations including:
detecting occurrence of a sheet jam, and
displaying, based on detecting the occurrence and position of the sheet jam, text concurrently with a moving image indicating at least work to remove the jammed sheet,
wherein the text includes at least information that indicates work that a user is to carry out after removing the jammed sheet, and does not include information that indicates work where the user opens a cover to access the jammed sheet.

8. A method for controlling an image processing apparatus, the method comprising:
detecting occurrence of a sheet jam; and
displaying, based on detecting the occurrence of the sheet jam, a moving image in a first area and a text in a second area that is different from the first area,
wherein the moving image shows work to be done to remove a jammed sheet,
wherein the text includes a part of entire work processes for removing the jammed sheet, and
wherein the text includes work that a user is required to carry out after removing the jammed sheet.

9. The method according to claim 8, wherein the moving image is a moving image displayed with chaptering for each work process in the entire work processes.

10. The method according to claim 8, wherein the text has already been displayed in the second area before the user carries out the work to remove the jammed sheet from the image forming apparatus.

11. An image processing apparatus comprising:
one or more processors; and
memory storing instructions that, when executed by the one or more processors, cause the image processing apparatus to perform operations including:
detecting occurrence of a sheet jam, and
displaying, based on detecting the occurrence of the sheet jam, a moving image in a first area and a text in a second area that is different from the first area,
wherein the moving image shows work to be done to remove a jammed sheet,
wherein the text includes a part of entire work processes for removing the jammed sheet, and
wherein the text includes work that a user is required to carry out after removing the jammed sheet.

12. The image processing apparatus according to claim 11, wherein the text has already been displayed in the second area before the user carries out the work to remove the jammed sheet from the image forming apparatus.

* * * * *